United States Patent [19]

Reinhardt et al.

[11] 4,128,814
[45] Dec. 5, 1978

[54] EXTERNAL BULB VARIABLE VOLUME MASER

[76] Inventors: Robert A. Frosch, Administrator of the National Aeronautics and Space Administration, with respect to an invention of Victor S. Reinhardt, Gaithersburg; Peter O. Cervenka, Rockville, both of Md.

[21] Appl. No.: 856,464

[22] Filed: Nov. 30, 1977

[51] Int. Cl.² .................................................. H01S 1/06
[52] U.S. Cl. ........................................ 331/94; 324/0.5
[58] Field of Search ..................... 331/94, 3; 324/0.5

[56] References Cited

U.S. PATENT DOCUMENTS

| | | | |
|---|---|---|---|
| 2,948,861 | 8/1960 | Babb | 331/94 |
| 3,209,280 | 9/1964 | Vessot et al. | 331/94 |
| 3,281,709 | 10/1966 | Dehmelt | 331/94 |
| 3,702,972 | 11/1972 | Fletcher | 331/94 |
| 3,924,200 | 12/1975 | Peters | 331/94 |

Primary Examiner—John Kominski
Attorney, Agent, or Firm—Robert D. Marchant; John R. Manning; John O. Tresansky

[57] ABSTRACT

A maser functioning as a frequency standard stable to one part in $10^{14}$ includes a variable volume, constant surface area storage bulb having a fixed volume portion located in a resonant cavity from which the frequency standard is derived. A variable volume portion of the bulb, exterior to the resonant cavity, has a maximum volume on the same order of magnitude as the fixed volume bulb portion. The cavity has a length to radius ratio of at least 3:1 so that the operation is attained without the need for a feedback loop. A baffle plate, between the fixed and variable volume bulb portions, includes apertures for enabling hydrogen atoms to pass between the two bulb portions and is an electromagnetic shield that prevents coupling of the electromagnetic field of the cavity into the variable volume bulb portion. The maser is operated so that the zero wall shift frequency thereof can be determined by being operated at first and second very accurately controlled temperatures for identical small and large volumes. From the two temperatures and volumes, the zero wall shift frequency is determined as the intersection of two straight lines.

8 Claims, 4 Drawing Figures

EXTERNAL BULB VARIABLE VOLUME MASER

ORIGIN OF THE INVENTION

The invention described herein was made in the performance of work under a NASA contract and by an employee of the United States Government and is subject to the provisions of Section 305 of the National Aeronautics and Space Act of 1958, Public Law 85-568 (72 Stat. 435; 42 U.S.C. 2457), and may be manufactured and used by or for the Government for governmental purposes without the payment of any royalties thereon or therefor.

BACKGROUND OF THE INVENTION

The present invention relates generally to atomic or molecular frequency standard masers and more particularly to such a maser that includes a variable volume, constant surface area storage bulb.

Masers employing collimated beams of atomic or molecular particles have been developed to provide frequency standards having very great stability. Typically, the beam consists of hydrogen atoms having a predetermined energy level, which atoms are confined for long periods in a storage bulb, usually having a Teflon coating. The confined masing atoms stimulate an electromagnetic field in a resonant cavity that is electromagnetically coupled to the storage bulb. Because the masing atoms are confined in the storage bulb, the stimulated frequency of the hydrogen maser is changed. Collisions of the hydrogen atoms with walls of the storage bulb cause this frequency change, known as the wall shift, which is given by:

$$f = \phi v/2\pi \cdot A/4V \qquad (1)$$

where:

$\phi$ = the average phase shift of the maser for each collision between the hydrogen atoms and the bulb wall;

$v$ = the average speed of hydrogen atoms colliding with the bulb wall;

$V$ = the volume of the bulb; and $A$ = the surface area of the bulb wall.

The expression $4V/A$, which is designated as $\lambda$, represents the mean free path of hydrogen atoms in the bulb between collisions.

In order to use the hydrogen maser as a primary frequency standard, it is necessary to correct for the wall shift. One technique which has been employed to correct for wall shift involves varying the length of the mean free path between wall collisions by operating different hydrogen masers with differing size storage bulbs and to make frequency comparisons between outputs of the masers. This technique has not produced particularly good results because the average phase shift per collision has not reproduced well from one bulb to another.

Another approach, which has proven more successful, involves providing a maser with a flexible, Teflon storage bulb so that the value of $\lambda$ can be varied while maintaining the average phase shift per collision constant. This approach does not require changing bulbs, yet provides for wall shift correction. In the variable volume arrangement, it is necessary to have an accurate knowledge of the ratio of the volumes of the bulbs in at least two different volumetric conditions. In addition, it is necessary to determine accurately the average phase shift per collision, as well as the corrected frequency, i.e., the frequency after the wall shift is considered. These average phase shift and frequency corrections must remain constant for the different volumes of the bulb. With careful measurement, the ratios of the two volumes can be determined to approximately 0.1%.

It has been found, however, that the volume ratio strongly affects the wall shift, and therefore, the frequency error. As the volume ratio approaches unity, the uncertainty in determining the correct frequency goes to infinity for given errors in measurements of the volume ratio and the frequencies of the maser for the different volumes. In a device that was actually constructed, the magnitude of the volume ratios was severely limited because the filling factor of the bulb is degraded at a compressed, relatively small volume of the bulb. In this device, having a bulb volume ratio in the range of 1.118:1.37, there were significant errors that could not be tolerated for frequency standards. In addition, it was found that changes in the surface properties of the Teflon bulb during the measurement process induced changes in stress of the bulb when the bulb volume was changed. The uncertainty resulting from the stress effects on the storage bulbs was a major factor in preventing the adoption of this variable volume device as a frequency standard.

To overcome the stress problem associated with the flexible bulb, it has been proposed to employ a thin, flexible Teflon cone attached to a rigid cylinder as a variable volume storage bulb. The advantage of this configuration is that a thin cone can be inverted in such a way that only the edges of the cone are stressed. By stressing only the edges of the cone, the region of possible stress is a negligibly small area, to eliminate the uncertainty due to surface stressing. However, in the device which was actually constructed, the maximum volume ratio was limited to 1.3 because of difficulties in obtaining maser oscillation with an inverted cone. The accuracy of the device was limited to $2.4 \times 10^{-12}$, rather than to the theoretical value of $10^{-14}$, because of the small maximum volume ratio, drifts in a reference maser that was beat against the maser including the thin, flexible Teflon cone, and because areas in the cone became exposed when the cone was inverted. The bulb also was asymmetrical, making it especially susceptible to magnetic inhomogeneity shifts, which have been found to cause errors as large as a few parts in $10^{12}$.

To overcome the problems associated with the thin, flexible Teflon cone device, it was proposed to combine the flexible cone with a large storage box hydrogen maser. In this device, a flexible cone is outside of the microwave cavity so the magnitude of the volume ratio is not limited by the desired frequency of oscillation. This device had the advantage of reducing magnetic inhomogeneity, and because the device has a line width factor of 10 narrower than a conventional hydrogen maser, anomalous spin change effects are correspondingly reduced.

The large storage box device included a pair of small resonant cavities, each having a length to diameter ratio of 1. Both cavities were external to the box which had a length, in the expanded position, of five feet, and a similar diameter. One of the cavities was a low level, output cavity, while the other cavity was a high level driving cavity, responsive to the output of a +60 db gain amplifier driven by the low level cavity. The resulting, high gain feedback loop is necesssary because the vast majority of the large box, where the stimulated emission of electromagnetic energy occurs, is outside of the resonant cavity, i.e., hydrogen atoms are not subjected to the electromagnetic fields of the cavity while they are in the vast majority of the large box. However, the amplifier in the feedback loop of the maser produces phase instability in the stimulated emission; the phase instability results in frequency drift, so that the accuracy of the standard is limited to one part in $10^{13}$. Frequency instability of the large box device was also caused by a relatively large uncertainty in the value of the volume ratio for the big box in its differing sizes. This uncertainty is due, to a large extent, to the extremely large volume of the box and the volume changes which are necessary.

Another device that has been proposed is the so-called Concertina hydrogen maser wherein a variable volume storage bulb is formed of a flexible Teflon film bellows which is located entirely within the resonant cavity. The bellows stretch effects are cancelled, to a first order, because of its configuration. In addition, the device has the great advantage of allowing measurements to be made over a continuous range of calibrated volumes. However, the asymmetrical arrangement of the storage bulb in the microwave, resonant cavity makes the device very susceptible to magnetic inhomogeneity problems.

In studying hydrogen masers, it has previously been discovered that a zero frequency wall shift occurs at approximately 100° C for FEP Teflon storage bulbs. Variable volume storage bulb devices have been proposed as null detectors for the zero wall shift point. The advantage of such devices is that there is no need to know the volume ratio accurately to calibrate for wall shift. The device can be operated in an automated fashion to maintain the zero wall shift. However, the problem in attaining the zero wall shift is that there is a tendency for the Teflon to outgas at the elevated temperature. Of course, outgassing is undesirable because it causes particles other than hydrogen to be produced in the bulb and interfere with the maser operation.

SUMMARY OF THE INVENTION

In accordance with one aspect of the invention, a frequency standard that is accurate to one part in $10^{14}$ is achieved with a hydrogen maser or the like that includes a variable volume, constant surface area storage bulb having a fixed volume portion located in a resonant cavity and a variable volume portion exterior to the cavity. To achieve the desired operation without the need for a feedback loop, the cavity, containing the fixed volume portion of the bulb, has a relatively long length to radius ratio of at least 3:1. Analyses that have been conducted indicated that if the cavity has a length to radius ratio of less than 3:1, the desired operation is not achieved. In prior art, variable volume bulb devices wherein the variable volume bulb portion has been outside of the cavity, e.g., the big box device, the length to diameter or width ratio of the resonant cavity has been unity.

The frequency standard maser of the present invention is operated so that the variable volume portion of the bulb has only two configurations, one in which the volume is a maximum and a second in which the volume is a minimum. When the variable volume portion has a maximum value, the volume thereof is approximately the same as the fixed volume portion, but the minimum volume is much less than the fixed volume. Thereby, there is a relatively large ratio between the total volume of the bulb for the two conditions of the variable volume portion and the problems mentioned supra with respect to bulb volume ratios of approximately unity are avoided.

By constructing the variable volume portion of the bulb as a truncated cone, similar to the truncated cone of the big box maser, most of the surface area of the variable volume portion stays under the same condition for the two volume conditions of the bulb because of the folding technique. The only change in the surface area is where the edges of the bulb fold over. Thereby, enhanced accuracy is attained with the present invention because there is virtually an insignificant difference in the surface area conditions of the variable volume bulb portion for the two volumetric conditions.

Another feature of the invention is that a metal baffle plate is provided between the fixed and variable volume portions of the bulb. The baffle plate includes apertures for enabling the hydrogen atoms to pass between the fixed and variable volume bulb portions. The metal baffle plate forms an electromagnetic shield to prevent coupling of the electromagnetic field of the cavity surrounding the fixed volume bulb portion to the variable volume bulb portion. This prevents the variable volume bulb portion from shifting the cavity frequency and thus degrading stability. Of course, the baffle is coated with Teflon so that hydrogen atoms impinging on it are not relaxed to the ground state.

The frequency standard of the present invention is employed to calibrate a conventional hydrogen maser to derive a very precisely known output frequency. Conventional hydrogen masers have great stability and are able to maintain a stable output frequency for several days. However, the output frequency of conventional masers, while being very stable, is shifted an unknown amount by the wall shift. The frequency standards of the present invention are therefore used to measure the wall shift of conventional masers so that the conventional maser is calibrated to an accuracy of one part in $10^{14}$. Present frequency standards employing casium beams are accurate to only one part in $10^{13}$.

For this application, the frequency standard of the present invention is preferably operated as a zero wall shift frequency device. However, operation as a zero wall shift frequency device is frequently not feasible because of the 100° temperature which is required.

In accordance with another aspect of the invention, the zero wall shift frequency of a hydrogen maser or the like is determined inferentially by operating the maser at two different, precisely controlled temperatures. The maser is operated so that the two precisely controlled temperatures are considerably below 100° C, so that the outgassing problem is obviated. At each of the temperatures, the bulb is maintained in two different volumetric conditions to establish a pair of relationships for the mean free path of the particles between wall collisions and frequency at both temperatures. Only two volumetric conditions must be established because there is a linear relationship between frequency and average mean free path of the particles between wall collisions at each temperature. The intersection between the linear relationships is determined to ascertain the zero wall shift frequency. To inferentially determine the zero wall shift frequency, a conventional maser is employed as the frequency reference.

It is, accordingly, an object of the present invention to provide a new and improved variable volume atomic or molecular frequency standard.

Another object of the invention is to provide a method of inferentially determining the zero wall shift frequency of a device which utilizes atoms or molecules in a storage bulb.

Another object of the invention is to provide an atomic or molecular frequency standard employing maser principles wherein frequency stability of one part in $10^{14}$ is achieved.

Another object of the invention is to provide a new and improved maser having fixed and variable portions respectively within and outside of a microwave resonant cavity.

Yet another object of the invention is to provide a hydrogen maser frequency standard wherein frequency stability to within one part in $10^{14}$ is achieved with a variable volume storage bulb means having a significant volume outside of a resonant cavity, which operation is achieved without the need for external, feedback circuitry to achieve masing.

Still another object of the invention is to provide a new and improved maser frequency standard employing a variable volume storage bulb that is partially within a resonant cavity and has a relatively small volume.

The above and still further objects, features and advantages of the present invention will become apparent upon consideration of the following detailed description of one specific embodiment thereof, especially when taken in conjunction with the accompanying drawing.

BRIEF DESCRIPTION OF THE DRAWINGS

In the drawings wherein like parts are marked alike.

DESCRIPTION OF THE PREFERRED EMBODIMENT

Figure 1:
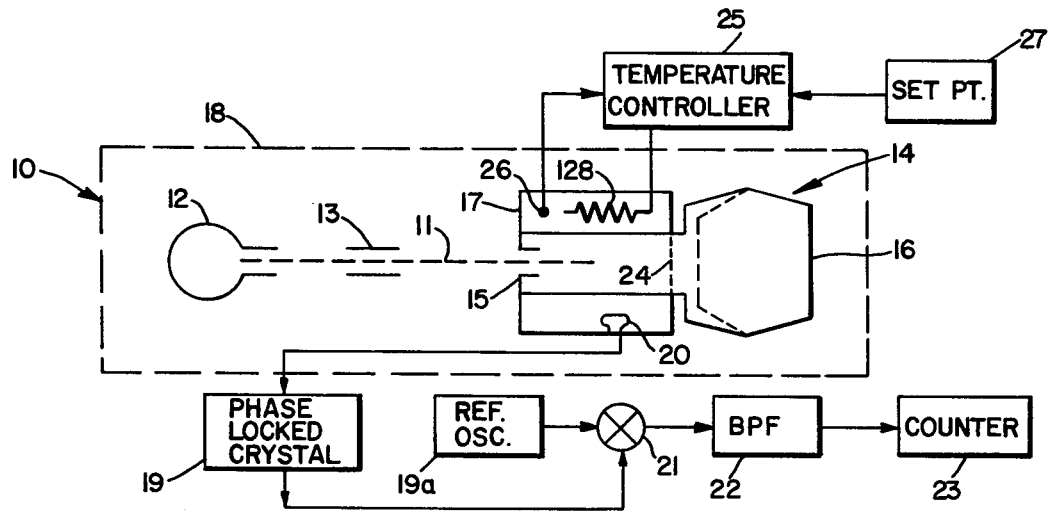
FIG. 1 is a schematic diagram of one embodiment of the invention.

Reference is now made to FIG. 1 of the drawing wherein maser 10 includes a state selected beam 11 of hydrogen atoms derived from RF hydrogen dissociator 12. Atoms from dissociator 12 are state selected and focused by an inhomogeneous magnetic field established by magnets 13. Beam 11 is focused into a variable volume, constant surface area, FEP Teflon storage bulb 14 having a fixed volume portion 15 and a flexible variable volume portion 16. In the expanded, maximum volumetric condition, bulb portion 16 is in the form of a pair of abutting truncated cones having common bases. In the minimum volumetric condition, the cone is folded down along its perimeter, on a center line through the common bases so that its upper face is in close proximity to the bulb portion 15. Fixed volume portion 15 is surrounded by a cylindrical, microwave resonant cavity 17 tuned to the frequency of oscillation stimulated by the hydrogen atoms of beam 11. Dissociator 12, magnets 13, bulb 14 and resonant cavity 17 are all located in an evacuated chamber 18.

To achieve the desired frequency stability of one part in $10^{14}$, fixed volume bulb portion 15 is surrounded by a resonant cylindrical cavity having a length to radius ratio of at least 3:1, and preferably 4:1, and the maximum volume of variable volume bulb portion 16 is approximately the same or is on the same order of magnitude as the fixed volume bulb portion 15. Variable volume bulb portion 16 has only two positions, minimum and maximum positions that are respectively approximately 0.1 and 0.8 times the volume of fixed volume bulb portion 15. As discussed infra in connection with FIG. 3, if the length to diameter, i.e., width, ratio of cavity 17 is one, the statistical error in the output frequency of cavity 17 for the two different volumetric conditions is unsatisfactory to attain an accuracy of one part in $10^{14}$. If, however, the length to width ratio is increased so that it is at least 1.5 and preferably 2, the statistical error in the output frequency drops appreciably for the two volumetric conditions of bulb portion 16 and accuracies of one part in $10^{14}$ are achieved.

The frequency excited in cavity 17 in response to masing of the hydrogen atoms of beam 11 in bulb 14 is used to phase lock a crystal oscillator 19. The phase locked output of the crystal is then mixed with the like output frequency of a maser reference oscillator 19a. To this end, pick up coil 20, located in cavity 17, derives a signal that phase locks the output of crystal oscillator 19. The beat frequency derived from mixer 21 is coupled through band pass filter 22 to counter 23 that derives a frequency comparison signal.

Separating fixed and variable volume bulb portions 15 and 16 is a baffle in the form of apertured, metal plate 24 that permits hydrogen atoms to propagate between portions 15 and 16 and which confines the electromagnetic field to cavity 17 because of the electromagnetic shielding properties of the plate. To prevent atoms impinging on plate 24 from relaxing to the ground state, the plate is coated with Teflon.

For frequency standard purposes, it is desired to determine the zero wall shift frequency of maser 10. However, the zero wall shift frequency occurs at approximately 100° C, a temperature which may cause outgassing from Teflon bulb 14. To positively obviate the possibility of outgassing, maser 10 is operated at each of two different volumes at two different temperatures considerably less than 100° C.

To this end, a very accurate temperature controller, known in the prior art, maintains cavity 17 and bulb 14 at two set point temperatures considerably less than 100° C. Temperature controller 25 is responsive to a temperature indicating signal derived from a temperature measuring probe, such as thermistor 26, and a set point signal derived from source 27. In response to the probe and set point signals, controller 25 derives an error signal to control the amount of current supplied to electric heater 128 so that the temperature of cavity 17 and bulb 14 is maintained to within approximately $5 \times 10^{-5}$° C of the temperature value established by set point source 27.

Figure 2:
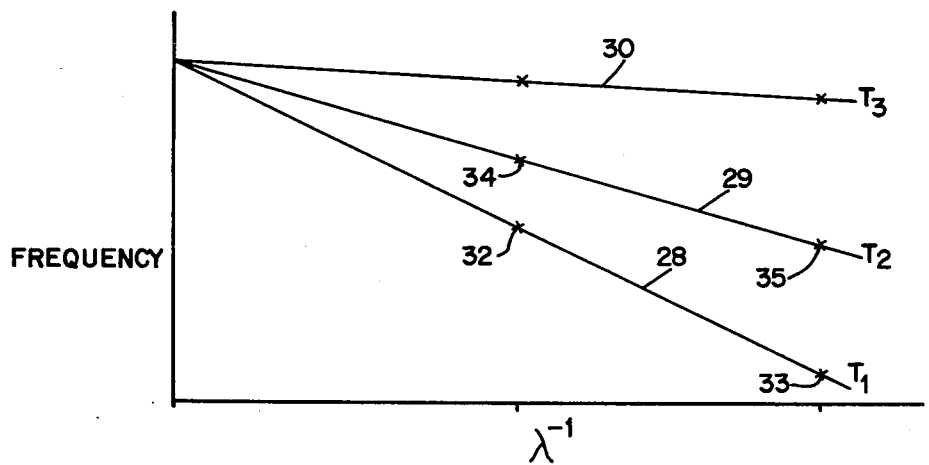
FIG. 2 is an illustration of curves helpful in describing the operation of the device of FIG. 1, and which illustrate the extrapolation method of the invention for determining zero wall shift frequency.

As indicated by Equation (1) supra, the wall shaft frequency of a hydrogen maser is a function of the mean free path of hydrogen atoms between wall collisions, $\lambda$. It has been found that the reciprocal of mean free path, $\lambda^{-1}$, equal to A/4V, is linearly related to the stimulated frequency for constant operating temperature trajectories of maser 10. This relationship is shown in FIG. 2 for temperatures $T_1$ and $T_2$ by straight line functions 28 and 29. Straight line 30, parallel to the $\lambda^{-1}$ or x axis of FIG.

2, represents the frequency versus mean free path reciprocal function for the zero wall shift temperature $T_3$. The first linear relationship, line 28, for the mean free path and the output frequency of maser 10, is established with set point source 27 and temperature controller 25, and by varying the volume of bulb portion 16. With bulb portion 16 at the maximum and minimum volumetric conditions, points 32 and 33 are respectively established along line 28. Thereafter, maser 10 is operated at temperature $T_2$ and a second relationship, along line 29, is established for the mean free path of the hydrogen atoms between wall collision and frequency. In particular, with maser 10 at temperature $T_2$, maximum and minimum volumetric conditions of bulb portion 16 are established, as indicated by points 34 and 35 on curve 29. Of course, the volumetric conditions of points 32 and 34 are the same, at the maximum volume of portion 16, and the volumetric conditions of points 33 and 35 are the same, at the minimum volume of portion 16. After points 32-35 have been determined, curves 28 and 29 are drawn and the intersection point thereof determines the zero wall shift frequency. By determining the zero wall shift frequency of maser 10, the frequency of stable, maser reference oscillator 19a can be accurately determined from the beat frequency derived from mixer 21.

This method does not require a linear relationship to be obtained between the wall shift and $\lambda^{-1}$ in order to determine the zero wall shift point. To extrapolate to zero wall shift, all that is necessary is that the wall shift, f, separate into independent functions of temperature, T, and $\lambda$, such that: $F = g(T)h(\lambda)$, where g and h are functions respectively of T and $\lambda$.

Figure 3:
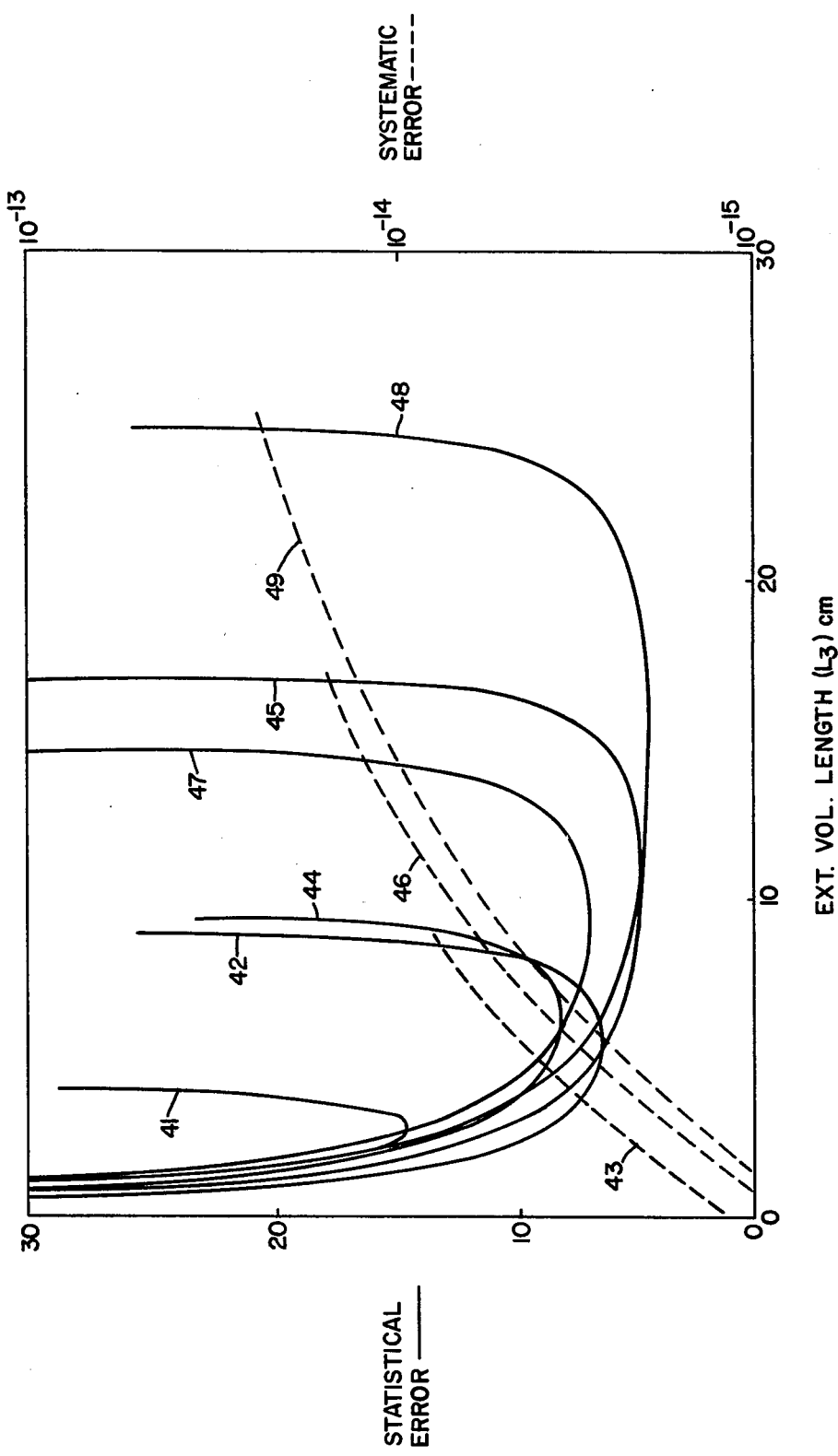
FIG. 3 is an illustration of curves indicating statistical and systematic errors for three different sets of ratios between the length and radius of resonant cavities used with hydrogen beam masers.

Reference is now made to FIG. 3 of the drawing wherein statistical and systematic errors are plotted as a function of the length of external bulb portion 16 at its maximum volumetric condition for the minimum and maximum volumes of bulb portion 16, for three different cavity lengths to cavity ratios. Curves 41 and 42 respectively indicate the statistical errors when cavity 17 has a diameter equal to its length for the small and large volumetric conditions of bulb portion 16, while curve 43 indicates the systematic error for a cavity having a diameter equal to its length. It is noted from an inspection of curves 41-43 that the errors are appreciable, and in fact are excessively large to attain a frequency standard having an accuracy of one part in $10^{14}$. In contrast, from curves 44 and 45, respectively indicative of the large and small volume statistical errors when cavity 17 has a length to radius ratio of 3:1, it is seen that the statistical errors are less than 10% for both volumetric conditions of bulb portion 16. Curve 46 indicates that the systematic error for a length to radius ratio of 3:1 is significantly less than that of a length to radius ratio of 2:1, as indicated by curve 43. Curves 44-46 indicate that the minimum length to radius ratio of cavity 17 is 3:1. For the longer length to radius ratio of 4:1 for cavity 17, as indicated by curves 47-49, the statistical errors for the maximum and minimum volumetric conditions, shown by curves 47 and 48, are even less than for the 3:1 length to radius ratio. Also, the systematic error, indicated by curve 49, is less for the 4:1 ratio than for both the 3:1 and 2:1 length to radius ratios.

Figure 4:
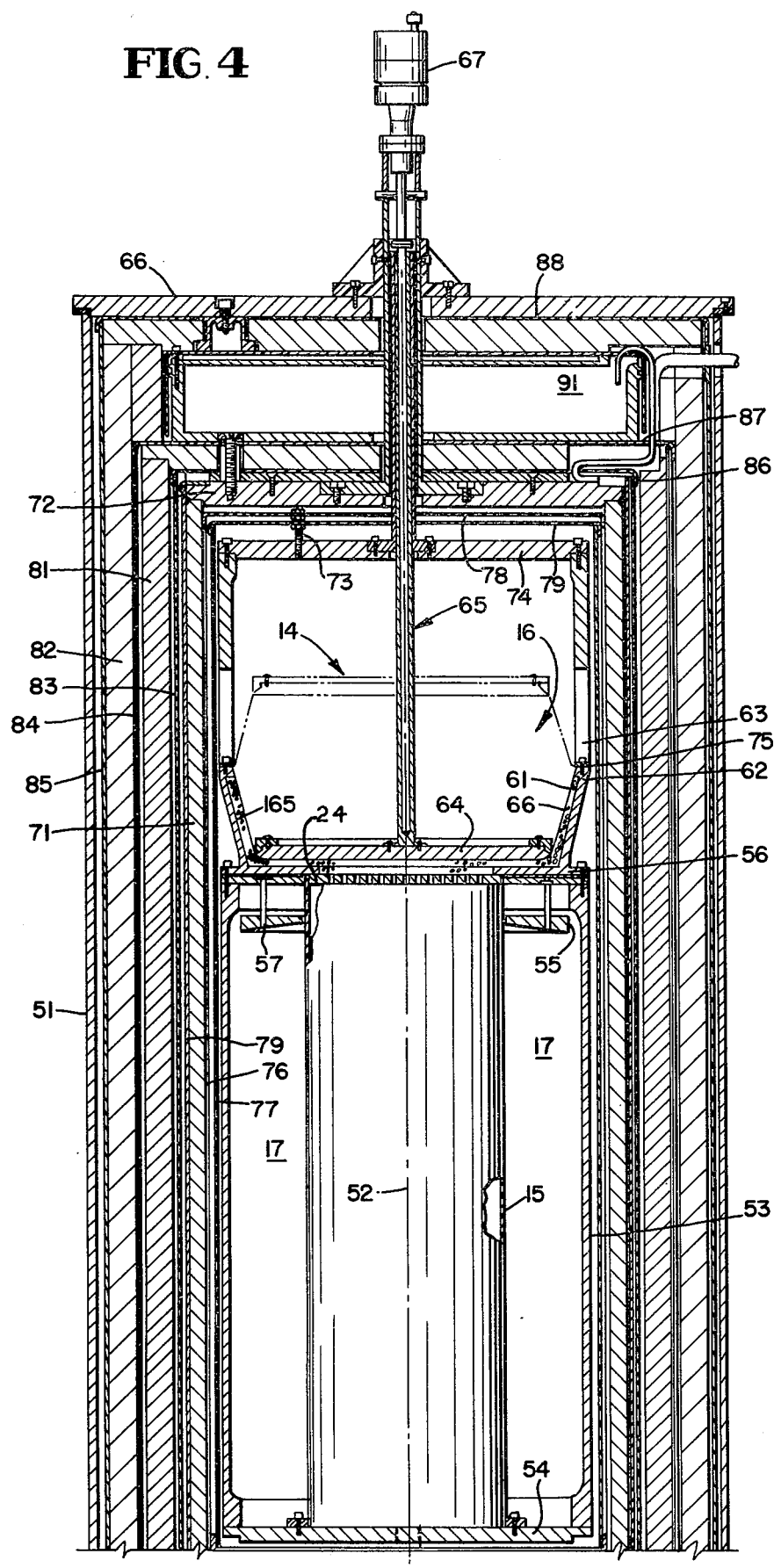
FIG. 4 is a side sectional view of the details of a maser in accordance with the invention.

Reference is now made to FIG. 4 of the drawing wherein a detailed side sectional view of a preferred embodiment for cavity 17 and bulb 14 is illustrated. The apparatus for housing bulb 14, cavity 17, and the mechanism associated therewith includes a cylindrical aluminum casing 51 having a longitudinal axis 52 about which fixed and variable volume bulb portions 15 and 16, as well as cavity 17, are concentric. Bulb portion 15 is formed as a cylinder of FEP Teflon film with a thickness of between 0.5 to 5 mils.

The exterior of cavity 17 is defined by cylindrical, aluminum wall 53, coaxial with bulb portion 15 and axis 52, and aluminum plates 24 and 54 secured to the top and bottom edges of the wall. Aluminum plate 54 has a relatively narrow, on-axis aperture, through which hydrogen atoms from source 12 pass, while plate 24 includes multiple, relatively small apertures. Plates 24 and 54 confine a $TE_{011}$ electromagnetic field stimulated in cavity 17 to the cavity while enabling the hydrogen atoms to pass from source 12 into bulb portion 15 and between bulb portions 15 and 16. Plate 54 includes a single, on-axis aperture because beam 11 is in collimated form when it passes through the plate. In contrast, plate 24 includes a multiplicity of relatively small apertures for enabling hydrogen atoms having random paths to pass between bulb portions 15 and 16. The apertures are small enough relative to the wavelength excited in cavity 17 to prevent the electromagnetic field in the cavity from being coupled through them. Both plates 24 and 54 are coated with Teflon so that hydrogen atoms which may impinge on them do not relax to the ground state.

To tune cavity 17 to the desired resonant frequency so that the $TE_{011}$ mode is established with maximum amplitude, an aluminum, Teflon coated tuning plate 55 is suspended from horizontal wall 56 at the top of cavity 17. The vertical position of tuning plate 55 can be adjusted to control the effective length of cavity 17 by suitable adjustment to bolts 57 that are secured in wall 56.

Immediately above baffle plate 24 is variable volume bulb portion 16. Bulb portion 16 includes a one-half mil Teflon film 61 having its edges secured in situ between vertically extending wall segments 62 and 63. Teflon film 61 extends from its edges to the bottom face of vertically translated platen 64, which it covers completely and to which it is bonded. Platen 64 is translated between the solid line position illustrated in FIG. 4 to the dotted line position by a plunger mechanism 65 that extends through plate 66, forming a portion of the outer casing. Plunger mechanism 65 is manually controlled by handle 67 so that it and Teflon film 61 assume only the maximum and minimum volumetric conditions illustrated.

In the minimum volumetric condition, film 61 extends as an inverted, truncated cone, from its edges downwardly to the lower face of platen 64. The cone has side legs extending parallel to interior face 165 of wall segment 62. Of course, the bottom and top faces of platen 64 and plate 24 are parallel to each other, as are legs 61 and face 165, which subtend an angle of approximately 15° relative to the vertical. There is thus formed chamber 66 between the adjacent faces of plate 24 and platen 64 and between the adjacent areas of film 61 and face 165. Cavity 66 is responsive to hydrogen atoms that flow through the apertures of baffle plate 24 to provide the minimum volumetric condition for bulb portion 16.

When handle 67 is activated so that plunger mechanism 65 draws platen 64 to the uppermost condition, illustrated by dotted lines, film 61 extends upwardly from its edge, between the intersection of wall segments 62 and 63 at the same angle relative to the vertical as when plunger 65 is in the lowered position. Thereby, the intersection between wall segments 62 and 63 to which the edge of film 61 is secured is midway between the bottom of platen 64 when it is in the upper and lower positions. With platen 64 in the upper position, the bottom face of the platen remains in the horizontal plane, parallel to the upper face of plate 24. Hydrogen atoms propagating through the apertures of plate 24 fill the entire volume defined by the upper position of platen 64, the upwardly extending legs of film 61, and face 165 of wall segment 62 to define the maximum volumetric condition of bulb 16. The surface area of variable volume bulb portion 16 is the same in both the maximum and minimum volumetric conditions of the bulb, whereby the only parameter which is affected by movement of platen 64 is the bulb volume and the mean free path of hydrogen atoms in the bulb is not changed by varying the bulb volume.

Bulb portions 15 and 16, as well as cavity 17, are located in an aluminum vacuum bell jar 71, formed as a cylinder coaxial with axis 52. Plate 72, forming the top of bell jar 71, is bonded to the top edge of the cylindrical portion of the bell jar. Plunger mechanism 65 extends through plate 72 and is surrounded by a suitable vacuum seal. Suspended from the bottom of plate 72 are bolts 73 that hold plate 74 in situ. Wall segment 63 is suspended from plate 74 to rigidly support the edges of Teflon film 61 between it and wall segment 62 that is secured to wall segment 63 by screws 75.

Bulb 14 and cavity 17 are thermally and magnetically shielded from the exterior environment. Thermal shielding is attained by a pair of cylindrical aluminum heat shields 76 and 77, concentric with axis 52, and capped by aluminum heat shielding plates 78 and 79. Plates 78 and 79 are held in situ by screws 73, between the lower and upper faces of plates 72 and 74, so that plates 76 and 77 extend between the inner face of cylinder 71 and the outer faces of the wall of cavity 17 and wall segments 62 and 63. Surrounding the exterior face of cylinder 71 is a further cylindrical aluminum heat shield 79. Between the exterior surface and heat shield 79 are cylindrical thermal insulating blankets 81 and 82, preferably formed of urethane foam. Magnetic shielding is provided by molybdenum Permalloy cylinders 83–85 which are respectively capped by molybdenum Permalloy plates 86–88. Magnetic shielding cylinders 83–85 are positioned between the thermal shields so that insulating cylinder 83 is between aluminum cylinders 79 and insulating cylinder 81. Permalloy shield 84 is between insulating shields 81 and 82, while Permalloy shield 85 is between foam 82 and the interior face of outer casing 51.

In a cavity formed at the top of casing 51, there is included an electronics package 91 including a phase locked loop. The phase locked loop is responsive to the signal picked up by loop 20 that extends into resonant cavity 17 to down convert the 1,420,405,751.7 68 Hz output signal of the cavity to a suitable lower frequency, in the megahertz range.

To precisely control the temperature within vacuum bell jar 71 to the temperature established by set point source 27, temperature monitoring probe 26 is mounted on the cylindrical wall of cavity 17. In response to the temperature signal derived from probe 26 and the desired set point temperature signal derived from source 27, controller 25 derives a temperature control signal for resistance heater 128. Heater 128 comprises bifilas wound resistance wire bonded on the exterior faces of the cylindrical wall of cavity 17 and bell jar 71. Current is supplied to these resistive coatings by controller 25 in such a manner as to maintain the temperature sensed by probe 26 at the set point value.

While there has been described and illustrated one specific embodiment of the invention, it will be clear that variations in the details of the embodiment specifically illustrated and described may be made without departing from the true spirit and scope of the invention as defined in the appended claims.

What is claimed is:

1. In an atomic or molecular frequency standard wherein a collimated beam of atomic or molecular particles is directed through an aperture into a variable volume, constant surface area storage bulb so that there are a random number of collisions between the particles and wall of the bulb and the frequency of the standard is shifted in response to the collisions, said bulb having a fixed volume portion located in a resonant cavity from which the frequency standard is derived, and a variable volume portion exterior to the cavity, said cavity having a length to width ratio of at least 1.5:1 so that stability of the standard is attained without the need for a feedback loop.

2. The standard of claim 1 wherein the bulb is constructed so that the external portion has maximum and minimum predetermined volumes, the maximum volume being on the same order of magnitude as the fixed volume, and the minimum volume being much less than the fixed volume.

3. The standard of claim 1 further including a baffle plate between the fixed and variable volume bulb portions, said baffle plate including multiple apertures for enabling the particles to pass between the two portions and forming an electromagnetic shield for preventing coupling of the electromagnetic field of the cavity into the variable volume bulb portion.

4. The standard of claim 1 wherein the variable bulb portion is formed as a pair of truncated cones when the variable bulb portion has maximum volume, said truncated cones having common bases, said bulb having an edge secured in situ in a plane through the common bases.

5. In an atomic or molecular frequency standard wherein a collimated beam of atomic or molecular particles is directed through an aperture into a variable volume, constant surface area storage bulb so that there are a random number of collisions between the particles and wall of the bulb and the frequency of the standard is shifted in response to the collisions, said bulb having a fixed volume portion located in a resonant cavity from which the frequency standard is derived, a variable volume portion exterior to the cavity, a baffle plate between the fixed and variable volume bulb portions, said baffle plate including apertures for enabling the particles to pass between the two portions and forming an electromagnetic shield for preventing coupling of the electromagnetic field of the cavity into the variable volume bulb portion.

6. A method of determining the zero wall shift frequency of an atomic or molecular frequency standard wherein a collimated beam of atomic or molecular particles is directed through an aperture into a variable volume, constant surface area storage bulb so that there are a random number of collisions between the particles and wall of the bulb and the frequency of the standard is shifted in response to the collisions, comprising operating the standard at a first temperature for two different bulb volumes to establish a first relationship for the mean free path of the particles between wall collisions and frequency, operating the standard at a second temperature for two different bulb volumes to establish a second relationship for the mean free path of the particles between wall collisions and frequency, both of said temperatures differing from the temperature for zero wall shift, and determining a common frequency for the first and second relationships, the common frequency being the zero wall shift frequency.

7. The method of claim 6 wherein the first and second relationships are linear functions of frequency versus the inverse of the mean free path, and ascertaining the frequency at which the two linear functions intersect to determine the common frequency.

8. The method of claim 7 wherein one of the bulb volumes at the first temperature equals one of the bulb volumes at the second temperature, and the other bulb volume at the first temperature equals the other bulb volume at the second temperature.

* * * * *